United States Patent [19]

Coffey et al.

[11] Patent Number: 5,864,441
[45] Date of Patent: Jan. 26, 1999

[54] ACTUATOR MOUNTING APPARATUS FOR TOP-DOWN DATA STORAGE SYSTEM ASSEMBLY

[75] Inventors: Jerome Thomas Coffey; Richard Edward Lagergren, both of Rochester; Jeffrey Fred Boigenzahn, Pine Island, all of Minn.

[73] Assignee: International Business Machines Corporation, Armonk, N.Y.

[21] Appl. No.: 693,438

[22] Filed: Aug. 7, 1996

Related U.S. Application Data

[63] Continuation of Ser. No. 351,806, Dec. 8, 1994, abandoned.

[51] Int. Cl.$^6$ .............................. G11B 5/55; G11B 21/08
[52] U.S. Cl. ......................... 360/97.01; 360/106
[58] Field of Search ............... 360/97.01, 97.02, 360/97.03, 105, 106, 107, 109, 98.01, 98.07, 104

[56] References Cited

U.S. PATENT DOCUMENTS

| | | | |
|---|---|---|---|
| 4,796,122 | 1/1989 | Levy et al. | 360/98.01 |
| 4,797,762 | 1/1989 | Levy et al. | 360/99.06 |
| 4,965,684 | 10/1990 | Stefansky | 360/97.01 |
| 5,021,905 | 6/1991 | Sleger | 360/97.02 |
| 5,109,310 | 4/1992 | Ohkjita et al. | 360/106 |
| 5,160,865 | 11/1992 | Gururangan | 360/98.07 |
| 5,187,621 | 2/1993 | Tacklind | 360/970.2 |
| 5,214,552 | 5/1993 | Haga | 360/106 |
| 5,231,557 | 7/1993 | Ogawa et al. | 360/106 |
| 5,251,082 | 10/1993 | Elliott et al. | 360/97.01 |
| 5,272,581 | 12/1993 | Kojima et al. | 360/98.01 |
| 5,293,282 | 3/1994 | Squires et al. | 360/77.08 |
| 5,406,431 | 4/1995 | Beecroft | 360/970.2 |
| 5,455,728 | 10/1995 | Edwards et al. | 360/97.03 |

FOREIGN PATENT DOCUMENTS 3-66085  3/1991  Japan .

*Primary Examiner*—David L. Ometz
*Attorney, Agent, or Firm*—Merchant, Gould, Smith, Edell, Welter & Schmidt

[57] ABSTRACT

An apparatus for mounting an actuator of a data storage system to a housing which uses a single mounting screw. The mounting screw is disposed within an aperture provided on the housing cover and a central bore of the actuator shaft, and secures the actuator shaft to a housing cover and base casting. A mounting boss is disposed on the base casting and adapted for registering with the actuator shaft and receiving the mounting screw. Efficient top-down assembly of standard and small form factor data storage systems is facilitated by employment of the novel actuator mounting apparatus.

9 Claims, 5 Drawing Sheets


ACTUATOR MOUNTING APPARATUS FOR TOP-DOWN DATA STORAGE SYSTEM ASSEMBLY

This is a Continuation of application Ser. No. 08/351,806, filed Dec. 8, 1994, now abandoned.

FIELD OF THE INVENTION

The present invention relates generally to data storage systems, and, more particularly, to an apparatus for mounting an actuator assembly within a data storage system housing using a single mounting screw.

BACKGROUND OF THE INVENTION

A typical data storage system includes one or more data storage disks coaxially mounted on a hub of a spindle motor. The spindle motor rotates the disks at speeds typically on the order of several thousand revolutions-per-minute. Digital information, representing various types of data, is typically written to and read from the data storage disks by one or more transducers, or read/write heads, which are mounted to an actuator and passed over the surface of the rapidly rotating disks.

The actuator typically includes a plurality of outwardly extending arms with one or more transducers being mounted resiliently or rigidly on the extreme end of the arms. The actuator arms are interleaved into and out of the stack of rotating disks, typically by means of a coil assembly mounted to the actuator. The coil assembly generally interacts with a permanent magnet structure, and the application of current to the coil in one polarity causes the actuator arms and transducers to shift in one direction, while current of the opposite polarity shifts the actuator arms and transducers in an opposite direction.

In a typical digital data storage system, digital data is stored in the form of magnetic transitions on a series of concentric, closely spaced tracks comprising the surface of the magnetizable rigid data storage disks. The tracks are generally divided into a plurality of sectors, with each sector comprising a number of information fields. One of the information fields is typically designated for storing data, while other fields contain sector identification and synchronization information, for example. Data is transferred to, and retrieved from, specified track and sector locations by the transducers being shifted from track to track, typically under the control of a controller. The transducer assembly typically includes a read element and a write element. Other transducer assembly configurations incorporate a single transducer element used to write data to the disks and read data from the disks.

Writing data to a data storage disk generally involves passing a current through the write element of the transducer assembly to produce magnetic lines of flux which magnetize a specific location of the disk surface. Reading data from a specified disk location is typically accomplished by a read element of the transducer assembly sensing the magnetic field or flux lines emanating from the magnetized locations of the disk. As the read element passes over the rotating disk surface, the interaction between the read element and the magnetized locations on the disk surface results in the production of electrical pulses in the read element. The electrical pulses correspond to transitions in the magnetic field.

A trend has developed in the data storage system manufacturing community to miniaturize the chassis or housing of a data storage system to a size suitable for incorporation into miniature personal computers, such as lap-top and pocket-sized computers, for example. Various industry standards have emerged that specify the external housing dimensions of small and very small form factor data storage systems. One such recognized family of industry standards is the PCMCIA (Personal Computer Memory Card Industry Association) family of standards, which specifies both the dimensions for the data storage system housing and the protocol for communicating control and data signals between the data storage system and a host computer system coupled thereto. Recently, four families or types of PCMCIA device specifications have emerged. By way of example, a Type-I PCMCIA data storage system must be fully contained within a housing having a maximum height dimension of 3.3 millimeters (mm). By way of further example, a Type-II PCMCIA device housing must not exceed a maximum height of 5.0 mm in accordance with the PCMCIA specification. A maximum height of 10.5 mm is specified for the housing of Type-III PCMCIA devices, and Type-IV devices are characterized as having a maximum housing height dimension in excess of 10.5 mm.

It is anticipated that the industry trend of continued miniaturization of data storage systems will eventually result in the production of systems complying with the Type-II PCMCIA specification. Such Type-II PCMCIA data storage systems will likely have external housing dimensions of approximately 54 mm×86 mm×5 mm, and include a data storage disk having a diameter of approximately 45 mm and a width dimension similar to that of a standard credit card. The trend toward reducing data storage system housing dimensions imposes a number of design constraints that often necessitate employment of new and previously untried methods for mounting system components within the relatively compact housing configuration of relatively small form factor systems. Such data storage systems must also generally be designed for manufacture in a high-volume production environment. Minimizing the number of system components and the complexity of assembling these components is generally of considerable concern, as inefficient assembly practices negatively impact the cost and rate of manufacturing such systems.

There exists in the data storage system manufacturing industry a keenly felt need to provide an apparatus that facilitates efficient top-down assembly of system components within the data storage system housing, and, in particular, the rotatable actuator. Prior art actuator mounting schemes typically employ a plurality of mounting screws to secure the actuator shaft to an internal sub-structure provided within the housing. One conventional actuator mounting scheme, for example, employs a bottom mounting screw for securing a bottom portion of the actuator shaft to the substructure and a top mounting screw to secure the top portion of the actuator shaft to the sub-structure.

Such prior art actuator mounting schemes are generally not suitable for use in data storage systems designed for manufacture in an efficient top-down assembly environment. Installation of the bottom mounting screw, for example, generally requires that the partially assembled data storage system be turned upside-down, thereby dislodging any unsecured or partially installed system component or requiring various retention arrangements or fasteners to secure movably mounted and unsecured components. The additional supporting sub-structures and retention arrangement associated with conventional actuator mounting schemes generally add to the cost and complexity of the data storage system and procedures for manufacturing such systems. Moreover, these and other prior art actuator mounting schemes are generally not suitable for employment within the compact packaging configurations of small and very small form factor data storage system housings.

SUMMARY OF THE INVENTION

The present invention is an apparatus for mounting an actuator of a data storage system within a housing using a single mounting screw. The mounting screw is disposed within an aperture provided on the housing cover and a central bore of the actuator shaft, and secures the actuator shaft to the housing cover and a base casting. A mounting boss is preferably disposed on the base casting and adapted for registering with the actuator shaft and receiving the mounting screw. Efficient top-down assembly of standard and small form factor data storage systems is facilitated by employment of the novel actuator mounting apparatus.

DETAILED DESCRIPTION OF THE PREFERRED EMBODIMENTS

Figure 1:
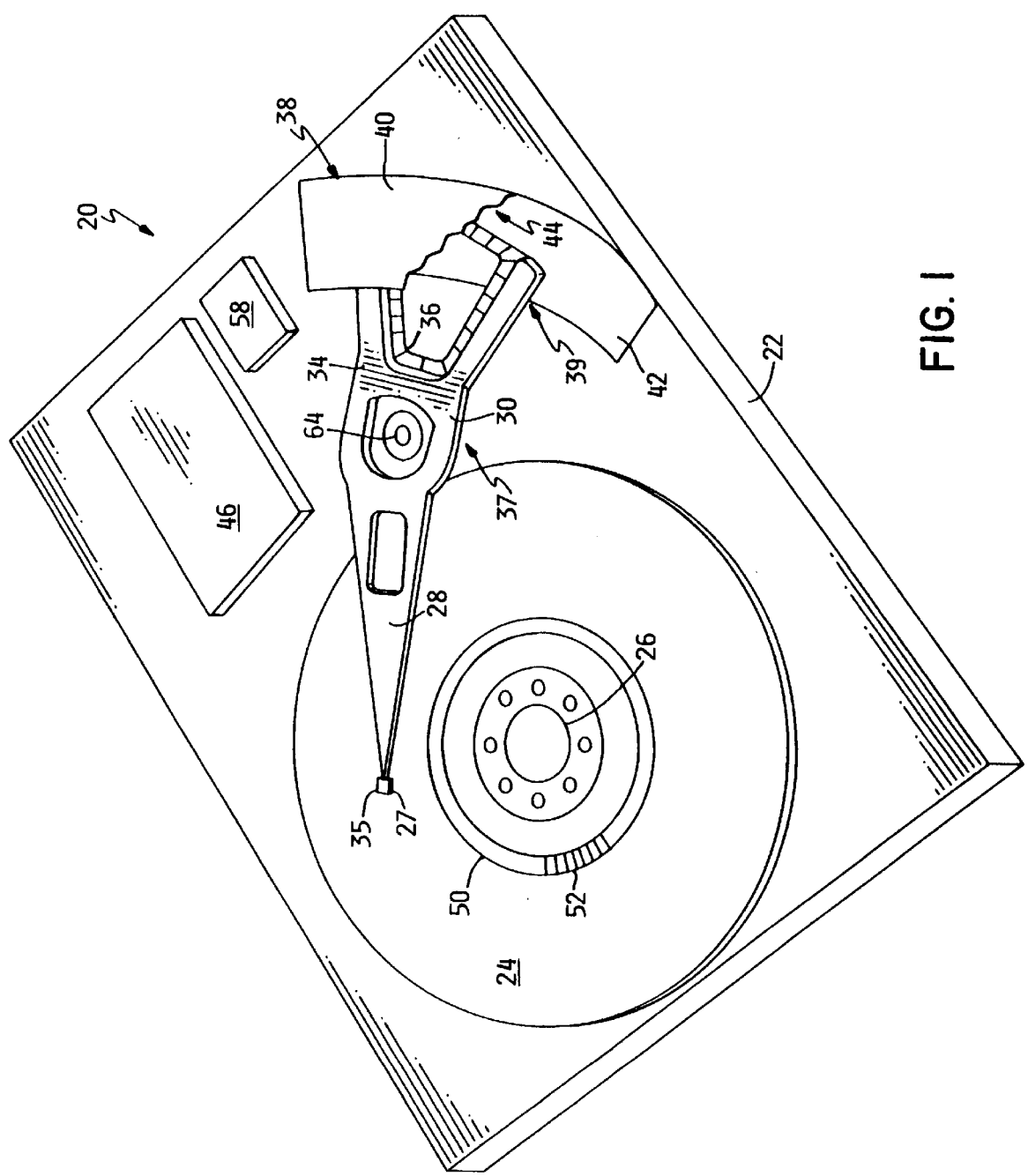
FIG. 1 is a top perspective view of a data storage system with its upper housing cover removed.
Figure 2:
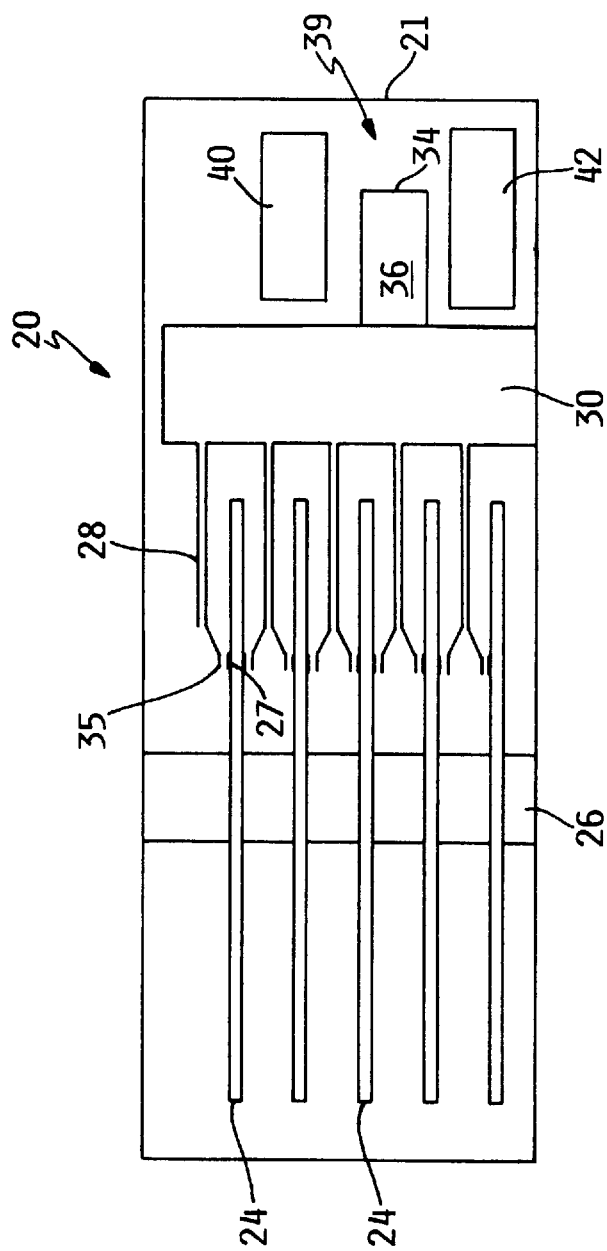
FIG. 2 is a side plan view of a data storage system comprising a plurality of data storage disks.

Referring now to the drawings, and more particularly to FIGS. 1 and 2, there is shown a data storage system 20 with the cover removed from the base 22 of the housing 21. The data storage system 20 typically includes one or more rigid data storage disks 24 which are stacked coaxially in a tandem spaced relationship, and rotate about a spindle motor 26 at a relatively high rate of rotation. Each disk 24 is typically formatted to include a plurality of spaced concentric tracks 50, with each track being partitioned into a series of sectors 52 which, in turn, are further divided into individual information fields. One or more of the disks 24 may alternatively be formatted to include a spiralled track configuration.

An actuator 30 typically includes one or more actuator arms 28, with each arm having one or more transducer 27 and slider body 35 assemblies mounted thereon for reading and writing information to and from the data storage disks 24. The slider body 35 is typically designed as an aerodynamic lifting body that lifts the transducer 27 off of the surface of the disk 24 as the rate of spindle motor 26 rotation increases, and causes the transducer 27 to hover above the disk 24 on an air bearing produced by airflow patterns produced by high-speed disk rotation. A conformal lubricant may alternatively be disposed on the disk surface 24 to reduce static and dynamic friction between the slider body 35 and disk surface 24.

The actuator 30 is usually mounted to a stationary actuator shaft 64, and rotates on the shaft to move the actuator arms 28 into and out of the stack of data storage disks 24.

A coil assembly 36, mounted to a coil frame 34 of the actuator 30, generally rotates within a gap 44 defined between the upper and lower magnet assemblies 40 and 42 of a permanent magnet structure 38, causing the actuator arms 28, in turn, to sweep over the surface of the data storage disks 24. The spindle motor 26 typically includes a polyphase, a.c. motor or, alternatively, a d.c. motor, energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a controller 58. The actuator voice coil motor 39 may alternatively comprise a single permanent magnet, such as the lower magnet assembly 42, for example. The actuator voice coil motor 39 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34, in turn, cause corresponding rotational movement of the actuator arms 28 in directions dependent on the polarity of the control currents flowing in the coil assembly 36. A controller 58 preferably includes control circuity that coordinates the transfer of data to and from the data storage disks 24, and cooperates with the actuator voice coil motor 39 to move the actuator arms 28 and transducers 27 to prescribed track 50 and sector 52 locations when reading and writing data to and from the disks 24.

Figure 3:
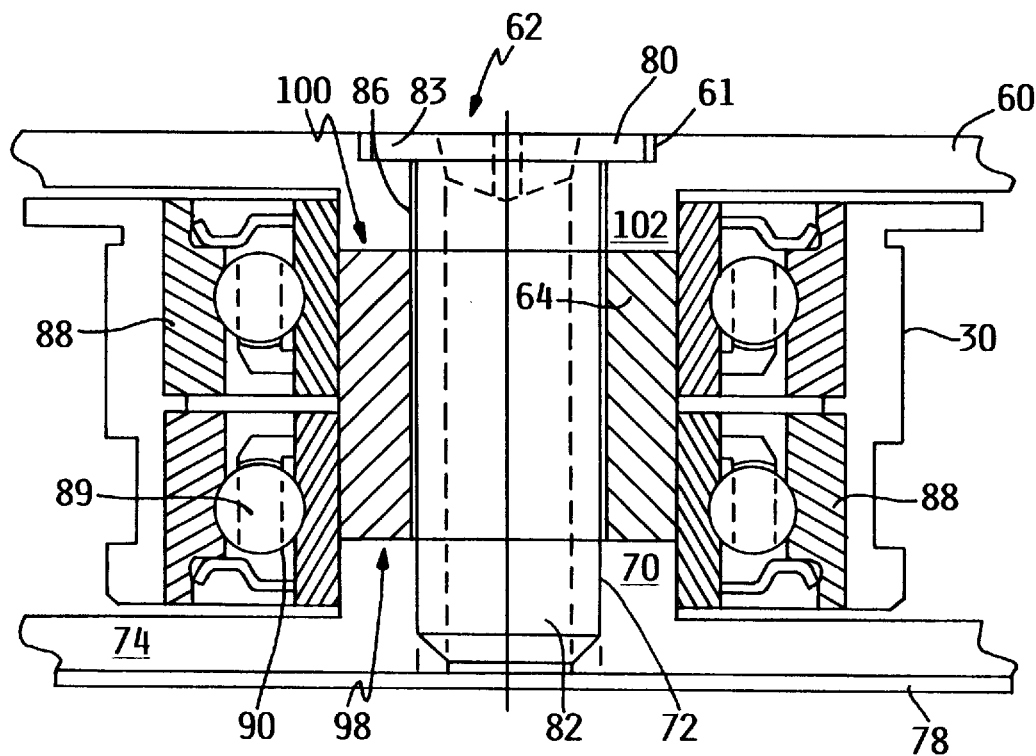
FIG. 3 is a cross sectional view of a novel apparatus for mounting an actuator within a data storage system housing using a single mounting screw.

Turning now to FIG. 3, there is shown an illustration of a preferred embodiment of a novel actuator mounting apparatus. A single mounting screw 80 is employed to securely couple the shaft 64 of the actuator 30 to the base casting 74 and to the housing cover 60. Efficient top-down assembly of the novel actuator mounting apparatus is facilitated by registering the actuator 30 and shaft 64 with a mounting boss 70 disposed on the base casting 74. An aperture 62 provided on the housing cover 60 is then preferably registered with a central bore 86 of the actuator shaft 64. A single mounting screw 80 is then inserted through the housing cover aperture 62 and central bore 86 of the actuator shaft 64, and into a mounting hole 72 disposed in the mounting boss 70 adapted for receiving the mounting screw 80. The single mounting screw 80 securely couples the shaft 64 of the actuator 30 to both the base casting 74 and the housing cover 60.

The novel actuator mounting apparatus advantageously provides for simply-supported mounting of an actuator shaft 64 by fixedly securing the shaft 64 to the base casting 74 and housing cover 60 with a single mounting screw 80. It is noted that conventional simply-supported actuator mounting schemes generally employ two or more mounting screws to respectively secure the top and bottom ends of the actuator shaft. Use of a single mounting screw in conventional actuator mounting schemes is generally precluded or avoided due to undesirable alteration in actuator bearing assembly 88 performance, and, in particular, detrimental altering in the designed preloading of the actuator bearings 89 on the inner bearing race 90. These and other factors that adversely affect actuator bearing assembly 88 performance generally result in accelerated bearing assembly 88 fatigue and a significant reduction in the service life of the actuator 30.

Further, prior art actuator mounting schemes employing a single mounting screw to provide a cantilevered supported actuator generally suffer from vibrational instability often resulting in deleterious perturbations in actuator 30 rotation.

It is noted that a cantilevered supported member is one in which one end of the member is fixedly secured to a support structure, while the other end of the member is left unsupported. Instabilities in actuator 30 rotation have been identified as contributing to a number of data storage system performance maladies, including read/write errors and track misregistration errors of varying severity.

As discussed previously, the trend toward continued data storage system miniaturization has led to new packaging and component mounting techniques, as well as obviation of long-observed design constraints and considerations. It has been determined that the novel actuator mounting apparatus of the present invention provides for secure and stable simply supported mounting of the actuator 30 using a single mounting screw 80. Securement of the actuator shaft 64 directly to the housing cover 60 eliminates the need for an additional mounting structure interposing the actuator shaft 64 and the housing cover 60. As such, the actuator mounting apparatus of the present invention is particularly well-suited for incorporation into small form factor data storage systems and other systems having relatively compact housing configurations.

In the embodiment illustrated in FIG. 3, the actuator 30 includes an upper mounting recess 100 and a lower mounting recess 98. A bearing assembly 88 is circumferentially disposed adjacent the actuator shaft 64. The axial length of the bearing assembly 88 is preferably longer than that of the actuator shaft 64, thereby respectively forming the circumferential upper and lower mounting recesses 100 and 98. The housing cover 60 preferably includes a cover boss 102 dimensioned to fit snugly within the upper mounting recess 100. A mounting boss 70 preferably extends upwardly from the base casting 74, and is dimensioned for protruding into the lower mounting recess 98 of the actuator 30. The mounting boss 70 preferably provides the datum surface for horizontally and vertically orienting the actuator 30 within the data storage system housing 21. The horizontal positioning of the actuator 30, or more specifically, the actuator shaft 64, is preferably determined by the location of the mounting boss 70 on the base casting 74. The vertical height of the actuator 30 with respect to the base casting 74 is preferably determined by the vertical dimension of the mounting boss 70. Accurate positioning of the actuator shaft 64 is thus facilitated by registering the lower mounting recess 98 of the actuator 30 with the mounting boss 70 disposed on the base casting 74.

The actuator shaft 64 preferably includes a central bore 86 that extends entirely through the shaft 64. Secure and stable mounting of the actuator 30 is referably provided by the mounting screw 80 extending through the central bore 86 of the actuator shaft 64 and coupling together the housing cover 60 and base casting 74. The mounting screw 80 preferably includes a threaded end 82 that is received by a mounting hole 72 disposed on the mounting boss 70. During manufacture of the data storage system 20, the threaded end 82 is preferably inserted through the aperture 62 of the housing cover 60 and the central bore 86 of the actuator shaft 64. As the threaded end 82 is screwed into the mounting hole 72 of the mounting boss 70, the head 83 of the mounting screw 80 engages a recess 61 provided in the housing cover 60. Continued tightening of the mounting screw 80 into the mounting boss 70 results in the production of axial compressive forces between the actuator shaft 64, cover boss 102, and mounting boss 70 sufficient to prevent positional shifting by the actuator shaft 64 from its mounted configuration. A torque wrench may be used to develop an appropriate level of compressive force to ensure secured mounting of the actuator shaft 64.

Figure 4:
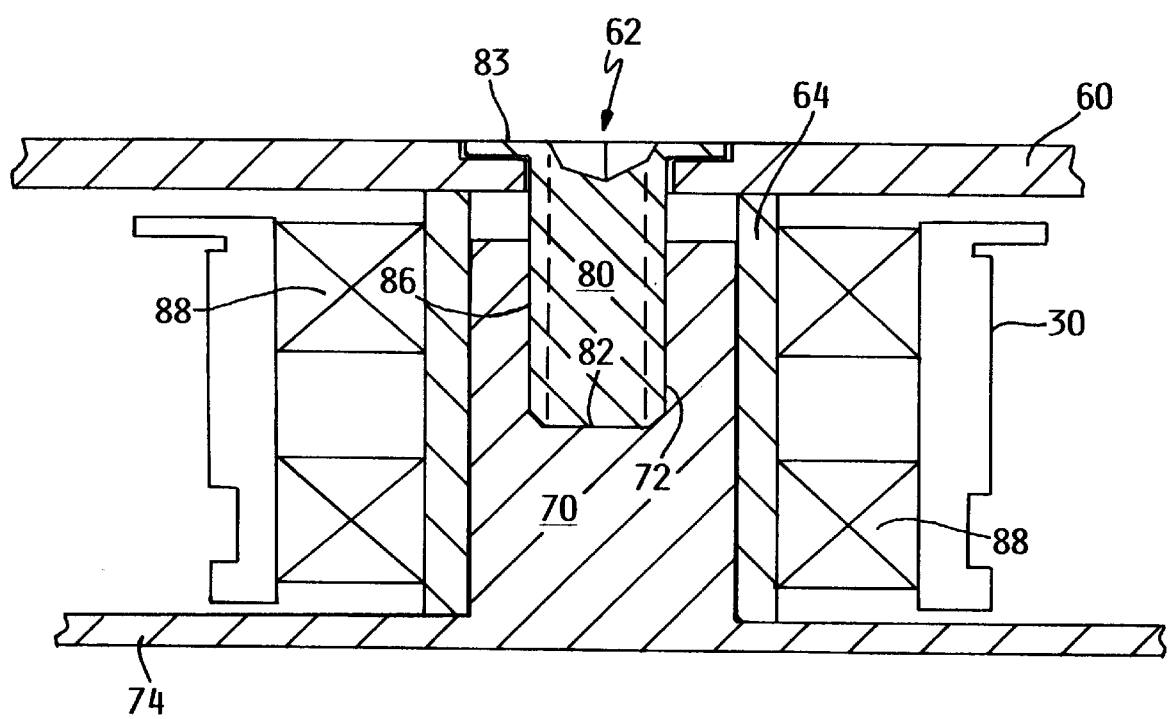
FIG. 4 is a cross-sectional view of an alternative embodiment of a novel apparatus for mounting an actuator within a data storage system housing using a single mounting screw.

In FIG. 4, there is shown an alternative embodiment of a novel actuator mounting apparatus. The mounting boss 70 preferably extends upward from the base casting 74 into a portion of the central bore 86 of the actuator shaft 64, and includes a mounting hole 72 for receiving the threaded end 82 of the mounting screw 80. Protrusion of the mounting boss 70 into the central bore 86 generally enhances registration of the actuator shaft 64 with the mounting boss 70.

Figure 5:
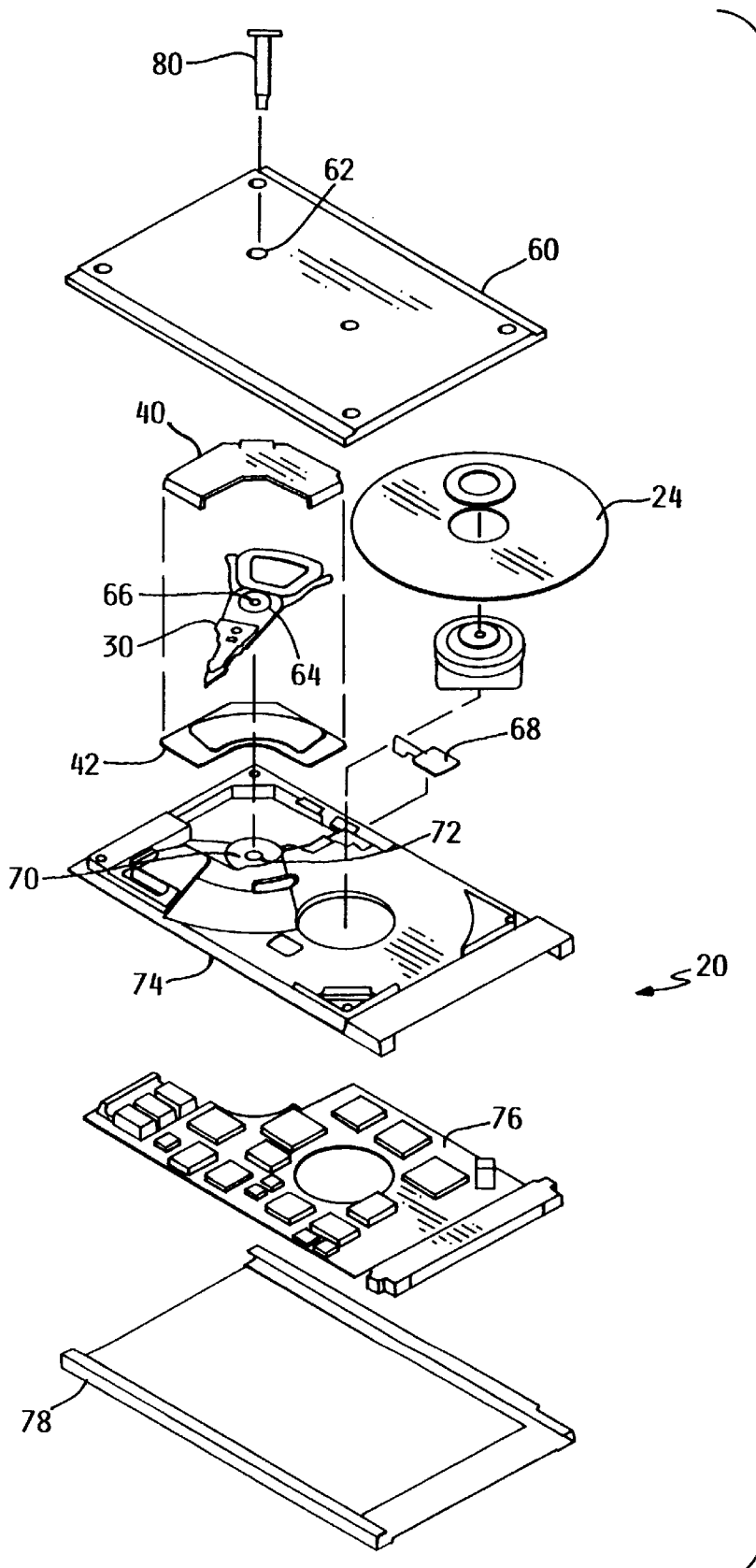
FIG. 5 is a perspective view of a small form factor data storage system employing a novel actuator mounting apparatus adapted for efficient top-down data storage system assembly.

Referring now to FIG. 5, there is shown an illustration of a data storage system incorporating a novel actuator mounting apparatus adapted for efficient top-down data storage system assembly. In practice, the base casting 74 is initially placed on a support table or bench, and the various mechanical components of the data storage system 20 are then installed in accordance with a top-down assembly procedure. It is noted that employing a top-down assembly procedure in the fabrication of data storage systems is generally recognized as a preferred method for effectuating efficient system assembly in a cost-sensitive, highvolume manufacturing environment. The base casting 74, upon which the actuator and other system components are preferably mounted, is then mounted over an electronics board 76 and the housing base 78. It is noted that the controller 58, various input/output connectors, and other system circuitry are generally mounted on the electronics board 76.

Top-down assembly of the novel actuator mounting apparatus includes initially installing the lower magnet assembly 42 of the permanent magnet structure 38 on the base casting 74. The actuator 30 is then installed to the base casting 74 by registering the central bore 86 of the actuator shaft 64 with the mounting boss 70. The upper magnet assembly 40 and actuator latch 68 are then installed. Engagement between the lower mounting recess 98 of the actuator 30 and the mounting boss 70 prevents translational shifting of the actuator 30 during data storage system 20 manufacture. Rotational movement of the actuator 30 is preferably restricted by cooperation between the permanent magnet structure 38 and the actuator latch 68. The housing cover 60 is positioned for securement after the internal system components have been installed by registering the cover aperture 62 with the central bore 86 of the actuator shaft 64. The mounting screw 80 is then inserted through the aperture 62 in the housing cover 60 and through the central bore 86 in the actuator shaft 64. Engagement between the threaded end 82 of the mounting screw 80 and the mounting hole 72 in the mounting boss 70 provides for secured mounting of the actuator shaft 64 to the housing cover 60 and the base casting 74.

It will, of course, be understood that various modifications and additions can be made to the embodiments discussed hereinabove without departing from the scope or spirit of the present invention. Accordingly, the scope of the present invention should not be limited to the particular embodiments discussed above, but should be defined only by the claims set forth below and equivalents of the disclosed embodiments.

What is claimed is:

1. An apparatus for mounting an actuator of a data storage system disposed in a housing, the apparatus comprising:

a housing cover defining an aperture;

the actuator including a shaft, the shaft defining:

an axis of rotation for the actuator and;

a central bore through the shaft proximate the aperture of the housing cover, the central bore having an axial length;

a base;

a mounting screw disposed within the aperture of the housing cover, extending through the entire axial length of the central bore, and directly received by the base, wherein the mounting screw connects to both the housing cover and the base and coincides with the axis of rotation of the actuator; and wherein efficient assembly of the data storage system is facilitated by the mounting screw being inserted through the aperture of the housing cover and the central bore of the shaft of the actuator, and being received by the base;

wherein a mounting boss is disposed on the base, and the actuator defines a lower mounting recessed portion configured to receive the mounting boss;

wherein the shaft has an axial end and the actuator includes a bearing assembly disposed adjacent the shaft, the bearing assembly having an axial end, the axial end of the bearing assembly extending beyond the axial end of the shaft so as to define the lower mounting recessed portion.

2. An apparatus as claimed in claim 1, wherein the base comprises a mounting boss for registering with the shaft, the mounting boss defining a mounting hole for receiving the mounting screw.

3. An apparatus as claimed in claim 2, wherein a portion of the mounting boss defining the mounting hole extends into a portion of the central bore of the shaft.

4. An apparatus for mounting an actuator of a data storage system disposed in a housing, the apparatus comprising:

a housing cover defining an aperture;

the actuator including a shaft, the shaft defining:
 an axis of rotation for the actuator and;
 a central bore through the shaft proximate the aperture of the housing cover, the central bore having an axial length;

a base;

a mounting screw disposed within the aperture of the housing cover, extending through the entire axial length of the central bore, and directly received by the base, wherein the mounting screw connects to both the housing cover and the base and coincides with the axis of rotation of the actuator; and wherein efficient assembly of the data storage system is facilitated by the mounting screw being inserted through the aperture of the housing cover and the central bore of the shaft of the actuator, and being received by the base;

wherein a cover boss is disposed on the housing cover, and the actuator includes an upper mounting recess for registering the shaft with the cover boss;

wherein the shaft has an axial end and the actuator includes a bearing assembly disposed adjacent the shaft, the bearing assembly having an axial end, the axial end of the bearing assembly extending beyond the axial end of the shaft so as to define the upper mounting recess.

5. An apparatus as claimed in claim 4, wherein the base comprises a mounting boss for registering with the shaft, the mounting boss defining a mounting hole for receiving the mounting screw.

6. An apparatus for mounting an actuator of a data storage system disposed in a housing, the apparatus comprising:

a housing cover defining an aperture;

the actuator including a shaft, the shaft defining:
 an axis of rotation for the actuator and;
 a central bore through the shaft proximate the aperture of the housing cover, the central bore having an axial length;

a base; and a mounting screw disposed within the aperture of the housing cover and the central bore, and directly received by the base, wherein the mounting screw connects to both the housing cover and the base and also secures the actuator to the base;

wherein the shaft has an axial end and the actuator includes a bearing assembly disposed adjacent the shaft, the bearing assembly having an axial end extending beyond the axial end of the shaft so as to define a recessed portion.

7. An apparatus as claimed in claim 6, wherein a mounting boss is disposed on the base, the recessed portion being configured to receive the mounting boss.

8. An apparatus as claimed in claim 6, wherein a cover boss is disposed on the housing cover, the recessed portion being configured to receive the cover boss.

9. An apparatus as claimed in claim 6, wherein:

the base includes a mounting boss defining a mounting hole; and the mounting screw is disposed within the housing cover aperture and the central bore and directly received by the mounting boss.

\* \* \* \* \*